(12) United States Patent
Jung

(10) Patent No.: US 9,423,558 B2
(45) Date of Patent: Aug. 23, 2016

(54) DISPLAY APPARATUS AND METHOD OF ASSEMBLING THE SAME

(71) Applicant: Samsung Display Co., Ltd., Yongin, Gyeonggi-do (KR)

(72) Inventor: Tai-Yun Jung, Pyeongtaek-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 130 days.

(21) Appl. No.: 14/517,767

(22) Filed: Oct. 17, 2014

(65) Prior Publication Data

US 2015/0219839 A1 Aug. 6, 2015

(30) Foreign Application Priority Data

Feb. 4, 2014 (KR) .......................... 10-2014-0012722

(51) Int. Cl.
*F21V 8/00* (2006.01)

(52) U.S. Cl.
CPC ........... *G02B 6/0091* (2013.01); *G02B 6/0065* (2013.01); *G02B 6/0073* (2013.01); *Y10T 29/49826* (2015.01); *Y10T 29/49963* (2015.01)

(58) Field of Classification Search
CPC   G02B 6/0091; G02B 6/0065; G02B 6/0073; Y10T 29/49826; Y10T 29/49963
See application file for complete search history.

(56) References Cited

U.S. PATENT DOCUMENTS

| 6,502,945 | B2 * | 1/2003 | Kim .................... G02B 6/0031 349/64 |
| 8,269,920 | B2 | 9/2012 | Lee et al. |
| 2011/0002112 | A1 * | 1/2011 | Hsu ................... G02F 1/133308 361/829 |
| 2012/0287666 | A1 * | 11/2012 | Kwon ............... G02F 1/133615 362/602 |
| 2013/0010413 | A1 * | 1/2013 | Kim ........................ G09F 9/33 361/679.01 |
| 2013/0194781 | A1 | 8/2013 | Kim |
| 2013/0247247 | A1 | 9/2013 | Ader et al. |
| 2015/0098026 | A1 * | 4/2015 | Kasai ............... G02F 1/133308 348/794 |

FOREIGN PATENT DOCUMENTS

| KR | 10-2007-0068119 A | 6/2007 |
| KR | 10-2008-0022991 A | 3/2008 |

(Continued)

OTHER PUBLICATIONS

Korean Patent Abstracts No. 10-2004-0062178 A for Patent No. KR 10-0902250 B1, 1 Page.

(Continued)

*Primary Examiner* — Mary Ellen Bowman
(74) *Attorney, Agent, or Firm* — Lewis Roca Rothgerber Christie LLP

(57) ABSTRACT

A display apparatus includes a backlight unit generating light, a bottom receiving member including a bottom portion and a first sidewall portion extending from the bottom portion to define a receiving space accommodating the backlight unit, an intermediate frame coupled to the bottom receiving member including a second sidewall portion facing the first sidewall portion and a cover portion extending inward from the second sidewall portion to cover an upper edge of the backlight unit, and a display panel on the cover portion for receiving the light from the backlight unit and displaying an image. The bottom receiving member includes a protrusion protruding outward from the first sidewall portion, and the intermediate frame includes a distance adjusting portion in an inner side surface of the second sidewall portion engaged with an outer surface of the protrusion to move the cover portion along a z-axis direction away from the bottom portion.

20 Claims, 10 Drawing Sheets

(56) References Cited

FOREIGN PATENT DOCUMENTS

| KR | 10-0902250 B1 | 6/2009 |
| KR | 10-0983581 B1 | 9/2010 |
| KR | 10-2012-0012556 A | 2/2012 |

OTHER PUBLICATIONS

Korean Patent Abstracts No. 10-2005-0058736 A for Patent No. KR 10-0983581 B1, 1 Page.

* cited by examiner

DISPLAY APPARATUS AND METHOD OF ASSEMBLING THE SAME

CROSS-REFERENCE TO RELATED APPLICATION

This application claims priority to and the benefit of Korean Patent Application No. 10-2014-0012722, filed on Feb. 4, 2014, the entire content of which is hereby incorporated by reference.

BACKGROUND

1. Field

The present disclosure relates to a display apparatus and a method of assembling the same.

2. Description of the Related Art

In general, a flat panel display apparatus, such as a liquid crystal display, includes a display panel to display an image and a backlight unit to provide light to the display panel.

The flat panel display apparatus includes a bottom chassis, a mold frame, and a top chassis to couple the display panel to the backlight unit. The bottom chassis includes a bottom portion and a sidewall extending from the bottom portion.

The sidewall is coupled to the mold frame. The backlight unit is accommodated or housed in the mold frame and the bottom chassis. The display panel is on the backlight unit.

The top chassis includes a cover portion to cover an edge of the display panel and a sidewall extending from the cover portion. The sidewall of the top chassis faces the sidewall of the bottom chassis. Accordingly, the top chassis faces the bottom chassis and is coupled to the bottom chassis to fix the display panel to the backlight unit.

In recent years, a narrow bezel structure minimizing a width of a non-active area of the display apparatus has been widely used.

SUMMARY

Aspects of embodiments of the present disclosure are directed toward a display apparatus having a narrow bezel structure.

Aspects of embodiments of the present disclosure are directed toward a method of assembling the display apparatus.

Aspects of embodiments of the present disclosure are directed toward a display apparatus having a narrow bezel and a method of assembling the display apparatus.

Aspects of embodiments of the present disclosure provide a display apparatus including a backlight unit configured to generate light, a bottom receiving member that includes a bottom portion and a first sidewall portion extending from the bottom portion to define a receiving space accommodating the backlight unit, an intermediate frame coupled to the bottom receiving member that includes a second sidewall portion facing the first sidewall portion of the bottom receiving unit and a cover portion extending inward from the second sidewall portion to cover an upper edge of the backlight unit, and a display panel on the cover portion for receiving the light from the backlight unit and displaying an image.

The bottom receiving member includes a protrusion protruding outward from the first sidewall portion, and the intermediate frame includes a distance adjusting portion (e.g., a groove) in an inner side surface of the second sidewall portion engaged with an outer surface of the protrusion. The engagement between the distance adjusting portion (e.g., the groove) and the protrusion is configured to move the cover portion along a z-axis direction away from the bottom portion.

Embodiments of the present disclosure provide a method of assembling a display apparatus. In one embodiment, the method includes positioning a backlight unit in a receiving spacer defined by a bottom receiving member including a bottom portion and a first sidewall portion extending from the bottom portion, and placing an intermediate frame including a second sidewall portion facing the first sidewall portion and a cover portion extending inward from the second sidewall portion to cover an upper edge of the backlight unit. The intermediate frame includes a distance adjusting portion (e.g., a groove) defined in an inner side surface of the second sidewall portion engaged with an outer surface of a protrusion protruding outward from the first sidewall portion of the bottom receiving member. The method also includes placing a display panel on the cover portion of the intermediate frame, wherein the display panel is configured to receive light from the backlight unit and display an image, and adjusting a distance between the cover portion and the backlight unit. The adjusting of the distance includes moving the cover portion along a z-axis direction away from the bottom portion by sliding the protrusion along the distance adjusting portion (e.g., the groove).

According to the embodiments described above, the distance adjusting portion (e.g., the groove) in the intermediate frame is configured to move in the z-axis direction along the outer surface of the protrusion on the bottom receiving member, and thus the distance between the cover portion of the intermediate frame and the optical sheet may be adjusted and corrected. As a result, the optical sheet may be prevented from being pressed against the cover portion of the intermediate frame and therefore the display quality of the display apparatus may be improved.

Additionally, in one embodiment, since the structure used to adjust the distance between the intermediate frame and the optical sheet requires a small space and a thin thickness, the structure used or utilized to adjust the distance may be realized in the display apparatus with a narrow bezel.

BRIEF DESCRIPTION OF THE DRAWINGS

The above and other embodiments of the present disclosure will become readily apparent by reference to the following detailed description when considered in conjunction with the accompanying drawings wherein.

DETAILED DESCRIPTION

Figure 1:
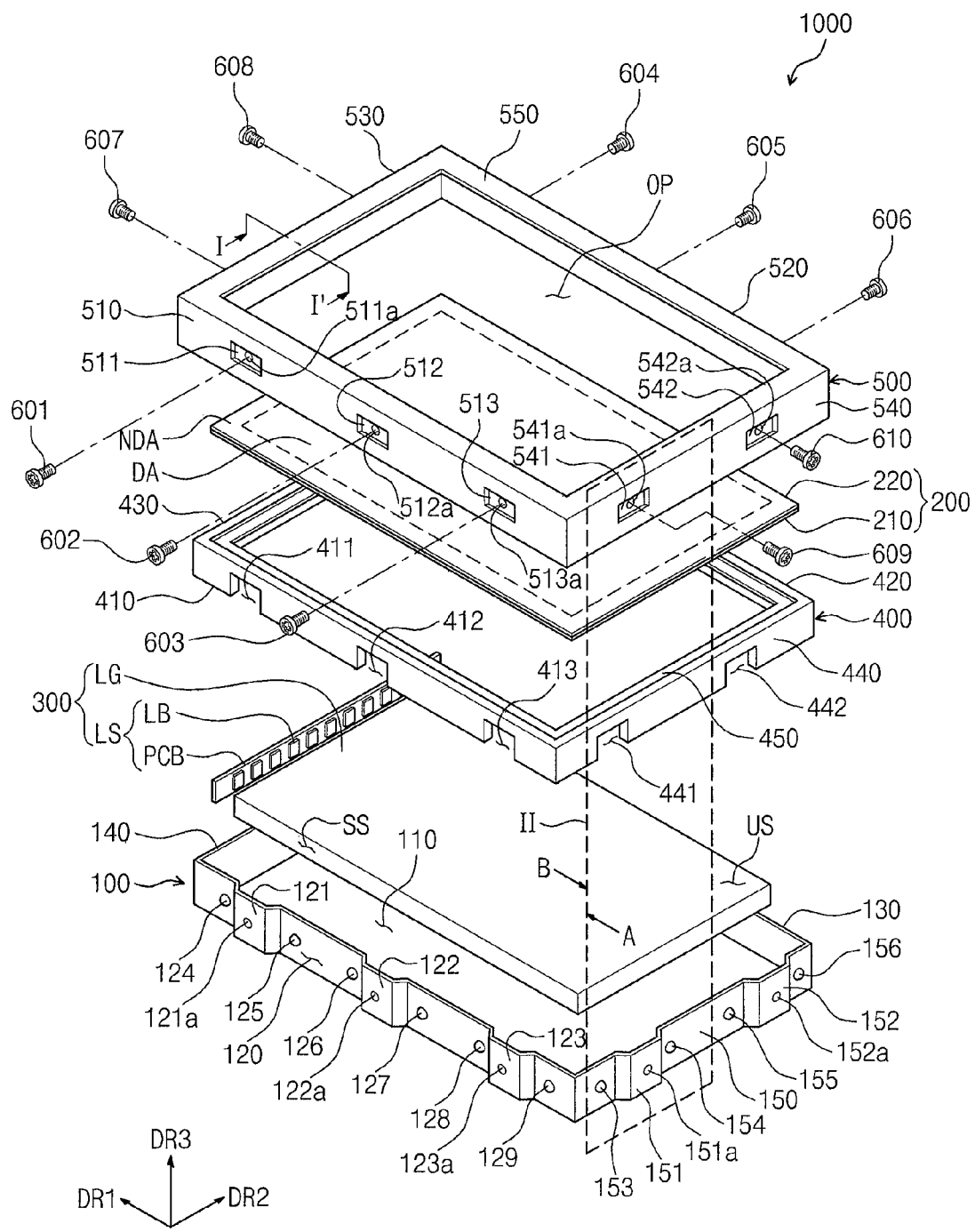
FIG. 1 is an exploded perspective view showing a display apparatus according to an example embodiment of the present disclosure.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly defined herein as such.

Hereinafter, the present invention will be explained in more detail with reference to the accompanying drawings.

Figure 2:
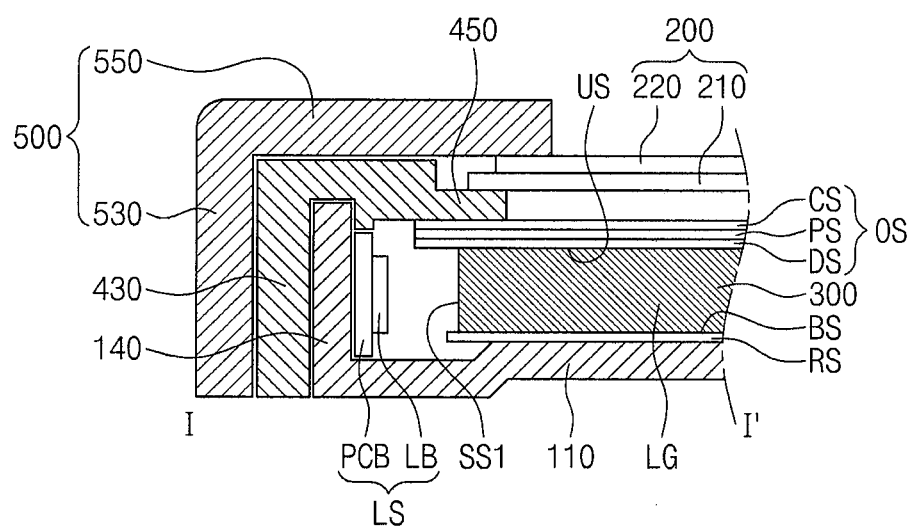
FIG. 2 is a cross-sectional view taken along a line I-I' shown in FIG. 1.

FIG. 1 is an exploded perspective view showing a display apparatus 1000 according to an example embodiment of the present disclosure and FIG. 2 is a cross-sectional view taken along a line I-I' shown in FIG. 1.

Referring to FIGS. 1 and 2, the display apparatus 1000 includes a backlight unit 300, a display panel 200, a bottom receiving member 100, a frame 400, and a top receiving member 500. The display apparatus 1000 may be a transmissive or transflective display apparatus that displays an image using light provided from the backlight unit 300.

The backlight unit 300 includes a light source LS to emit the light and a light guide member LG to guide the light from the light source LS to the display panel 200.

The light source LS includes a printed circuit board PCB and a plurality of light emitting devices LB mounted on the printed circuit board PCB. Although not shown in figures, the printed circuit board PCB includes at least one insulating layer and at least one circuit layer. The circuit layer includes wirings to supply a voltage to the light emitting devices LB.

The light guide member LG is disposed under the display panel 200. The light guide member LG includes a first or upper surface US, a second or back surface BS, and a plurality of side surfaces SS that connect the first surface US to the second surface BS. In the illustrated embodiment, the light guide member LG has a rectangular plate shape.

One of the side surfaces SS faces the light emitting devices LB. The side surface SS facing the light emitting devices LB is referred to as a light incident surface SS1 (refer to FIG. 2).

The light incident on the light incident surface SS1 exits through the first or upper surface US of the light guide member LG . The first surface US faces the display panel 200. The second or bottom surface BS is opposite to the first surface US.

As shown in FIG. 2, the backlight unit 300 may further include an optical sheet OS and a reflection sheet RS to improve efficiency in transmitting the light to the display panel 200. The optical sheet OS is disposed between the first surface US and the display panel 200.

The optical sheet OS includes a diffusion sheet DS, a prism sheet PS, and a protection or cover sheet CS. The diffusion sheet DS diffuses the light exiting through the first surface US of the light guide member LG. The prism sheet PS condenses the light diffused by the diffusion sheet DS in a direction substantially vertical or perpendicular to the display panel 200. The protection sheet CS protects the prism sheet PS. The diffusion sheet DS, the prism sheet PS, and the protection sheet CS each include a transparent material.

The reflection sheet RS is disposed under the second surface BS of the light guide member LG. The reflection sheet RS reflects the light transmitted through the second surface BS of the light guide member LG. Accordingly, the light reflected by the reflection sheet RS is re-incident on the second surface BS of the light guide member LG.

The display panel 200 receives the light from the backlight unit 300. For instance, the display panel 200 may be a liquid crystal display panel, an electrophoretic display panel, or an electrowetting display panel. In the illustrated embodiment, the display panel 200 is a liquid crystal display panel that includes a first substrate 210, a second substrate 220, and a liquid crystal layer interposed between the first and second substrates 210 and 220.

The top receiving member 500 and the bottom receiving member 100 are coupled to each other to form an outer surface of the display apparatus 1000. Together, the top receiving member 500 and the bottom receiving member 100 accommodate the backlight unit 300, the frame 400, and the display panel 200 therein or therebetween.

The bottom receiving member 100 is disposed under the display panel 200. The bottom receiving member 100 includes a bottom portion 110 and a first sidewall portion bent upward from the bottom portion 110.

In the illustrated example embodiment, the bottom portion 110 has a rectangular shape. In one or more alternate embodiments, the bottom portion 110 may have any other suitable shape. The first sidewall portion includes first, second, third, and fourth sidewalls 120, 130, 140, 150, respectively, bent or extending upwards from four sides of the bottom portion 110. The first to fourth sidewalls 120, 130, 140, 150 may be integrally formed as a single unitary and individual unit.

The bottom portion 110 and the first to fourth sidewalls 120 to 150 of the bottom receiving member 100 define a receiving space or cavity for receiving and accommodating the backlight unit 300.

The intermediate frame 400 is disposed between the top receiving member 500 and the bottom receiving member 100. The intermediate frame 400 includes a second sidewall portion and a cover portion 450 bent and extending inward from the second sidewall portion. The cover portion 450 covers a portion the backlight unit 300 and supports the display panel 200.

In the illustrated embodiment, the intermediate frame 400 may be, but is not limited to, a rectangular-shaped frame overlapping a non-display area NDA of the display panel 200 (e.g., the portion of display panel 200 overlapped by the intermediate frame 400 defines a non-display area NDA of the display panel 200). The second sidewall portion includes fifth, six, seventh, and eighth sidewalls 410, 420, 430, and 440. The fifth to eighth sidewalls 410 to 440 may be formed integrally with each other or formed separately from each other and coupled together by any suitable process, such as welding.

The intermediate frame 400 is on the bottom receiving member 100 and the fifth, sixth, seventh, and eighth sidewalls 410, 420, 430, 440 of the intermediate frame 400 are aligned and correspond to the first, second, third, and fourth sidewalls 120, 130, 140, 150 of the bottom receiving member 100, respectively. In particular, outer surfaces of the first to fourth sidewalls 120 to 150 of the bottom receiving member 100 face inner surfaces of the fifth to eighth sidewalls 410 to 440, respectively, of the intermediate frame 400.

The cover portion 450 of the intermediate frame 400 covers an edge of the optical sheet, e.g., the protection sheet CS, of the backlight unit 300 and prevents the optical sheet from moving (e.g., a portion of the cover portion 450 overlies a periphery of the protection sheet CS of the backlight unit 300). The display panel 200 is disposed on the cover portion 450.

The top receiving member 500 is disposed above the display panel 200.

The top receiving member 500 includes an opening OP formed therethrough to expose a portion of the display panel 200, (e.g., a display area DA in which the image is displayed). The top receiving member 500 covers the non-display area NDA of the display panel 200. The non-display area NDA is adjacent to the display area DA, but the image is not displayed in the non-display area NDA of the display panel 200.

In the illustrated embodiment, the top receiving member 500 has a rectangular-shaped frame when viewed in a plan view. The top receiving member 500 includes a third sidewall portion that forms the outer surface of the display apparatus 1000 and a front surface portion 550 bent inward from the third sidewall portion. The third sidewall portion includes ninth, tenth, eleventh, and twelfth sidewalls 510, 520, 530, 540, respectively. The ninth to twelfth sidewalls 510 to 540 may be integrally formed with each other or formed separately from each other and coupled together by any suitable process, such as welding.

The ninth to twelfth sidewalls 510 to 540 of the top receiving member 500 are aligned with and correspond to the fifth to eighth sidewalls 410 to 440 of the intermediate frame 400, respectively. In particular, outer surfaces of the fifth to eighth sidewalls 410 to 440 of the intermediate frame face inner surfaces of the ninth to twelfth sidewalls 510 to 540, respectively, of the top receiving member 500.

The front surface portion 550 of the top receiving member 500 covers the non-display area NDA of the display panel 200 and fixes the display panel 200 to the intermediate frame 400.

The top receiving member 500 is coupled to the bottom receiving member 100 such that the intermediate frame 400 is disposed between the top receiving member 500 and the bottom receiving member 100. As shown in FIG. 1, the top receiving member 500 is coupled to the bottom receiving member 100 by first to tenth screws 601, 602, 603, 604, 605, 606, 607, 608, 609, and 610.

Hereinafter, the coupling structure between the top receiving member 500, the bottom receiving member 100, and the intermediate frame 400 will be described in more detail.

Each of the first to fourth sidewalls 120 to 150 of the bottom receiving member 100 includes at least one engaging protrusion portion formed thereon. FIG. 1 shows only the engaging protrusions on the first and fourth sidewalls 120 and 150. First, second, and third engaging protrusions 121, 122, and 123 are on the first sidewall 120 and fourth and fifth engaging protrusions 151 and 152 are on the fourth sidewall 150. The first to third engaging protrusions 121 to 123 protrude outward from the outer surface of the first sidewall 120, and the fourth and fifth engaging protrusions 151 and 152 protrude outward from the outer surface of the fourth sidewall 150. The first to fifth engaging protrusions 121, 122, 123, 151, and 152 include first to fifth engaging holes 121a, 122a, 123a, 151a, and 152a, respectively.

The fifth to eighth sidewalls 410 to 440 of the intermediate frame 400 include cut-away portions corresponding to the engaging protrusions of the bottom receiving member 100. FIG. 1 shows first, second, and third cut-away portions 411, 412, and 413 defined in the fifth sidewall 410 that correspond to the first, second, and third engaging protrusions 121, 122, 123. FIG. 1 also shows fourth and fifth cut-away portions 441 and 442 defined in the eighth sidewall 440 that correspond to the fourth and fifth engaging protrusions 151 and 152. The first to third cut-away portions 411 to 413 in the frame 400 may be formed by cutting away portions of the fifth sidewall 410 to expose the first to third engaging protrusions 121 to 123 of the bottom receiving member 100, and the fourth and fifth cut-away portions 441 and 442 in the frame 400 may be formed by cutting away portions of the eighth sidewall 440 to expose the fourth and fifth engaging protrusions 151 and 152 of the bottom receiving member 100.

The ninth to twelfth sidewalls 510 to 540 of the top receiving member 500 include engaging recesses corresponding to the engaging protrusions on the bottom receiving member 100. FIG. 1 shows only the engaging recesses formed in the ninth and twelfth sidewalls 510 and 540 of the top receiving member 500. First, second, and third engaging recesses 511, 512, and 513 are formed in the ninth sidewall 510 and fourth and fifth engaging recesses 541 and 542 are formed in the twelfth sidewall 540. The first to third engaging recesses 511 to 513 are recessed inward from the outer surface of the ninth sidewall 510, and the fourth and fifth engaging recesses 541 and 542 are recessed inward from the outer surface of the twelfth sidewall 540. The first to fifth engaging recesses 511, 512, 513, 541, and 542 include sixth to tenth engaging holes 511a, 512a, 513a, 541a, and 542a, respectively.

When the top receiving member 500 is coupled to the bottom receiving member 100 such that the intermediate frame 400 is disposed between the top receiving member 500 and the bottom receiving member 100, the first, second, and third engaging holes 121a, 122a, and 123a defined in the first, second, and third engaging protrusions 121, 122, and 123 are aligned with the sixth, seventh, and eighth engaging holes 511a, 512a, and 513a, respectively, defined in the first, second, and third engaging recesses 511, 512, and 513 to form screw holes. Accordingly, the first, second, and third screws 601, 602, and 603 are engaged with the first, second, and third engaging holes 121a, 122a, 123a in the bottom receiving member 100, respectively, after passing through the sixth, seventh, and eighth engaging holes 511a, 512a, and 513a in the top receiving member 500. In addition, the fourth and fifth engaging holes 151 a and 152a defined in the fourth and fifth engaging protrusions 151 and 152 are aligned with the ninth and tenth engaging holes 541a and 542a, respectively, formed in the fourth and fifth engaging recesses 541 and 542 to form screw holes. Therefore, the ninth and tenth screws 609 and 610 are engaged with the fourth and fifth engaging holes 151a and 152a in the bottom receiving member 100 after passing through the ninth and tenth engaging holes 541 a and 542a in the top receiving member 500.

Although not shown in FIG. 1, the engaging protrusions disposed on the other sidewalls are engaged with the engaging recesses by the fourth to eighth screws 604 to 608 in the same manner as described above.

As described above, when the top receiving member 500 is coupled to the bottom receiving member 100 by the first to tenth screws 601 to 610, the backlight unit 300, the intermediate frame 400, and the display panel 200, which are accommodated in the bottom receiving member 100, are stably held in place.

Each of the first to fourth sidewalls 120 to 150 of the bottom receiving member 100 includes at least one protrusion formed therein. In one example embodiment, FIG. 1 shows first to sixth protrusions 124, 125, 126, 127, 128, and 129 adjacent to the first to third engaging protrusions 121, 122, 123 on the first sidewall 120 of the bottom receiving member 100. FIG. 1 also illustrates seventh to tenth protrusions 153, 154, 155, and 156 adjacent to the fourth and fifth engaging protrusions 151 and 152 on the fourth sidewall 150 of the bottom receiving member 100. In one embodiment, the bottom receiving member 100 also includes six protrusions on the second sidewall 130 and four protrusions on the third sidewall 140. That is, six protrusions are disposed on each of the first and second sidewalls 120 and 130 and four protrusions are disposed on each of the third and fourth sidewalls 140 and 150. In one or more alternate embodiments, the position and number of the protrusions on the bottom receiving member 100 is not limited to the position and number of protrusions illustrated in FIG. 1.

Although not shown in FIGS. 1 and 2, distance adjusting portions are formed on the fifth to eighth sidewalls 410 to 440 of the intermediate frame 400 that correspond to the protrusions on the bottom receiving member 100.

Hereinafter, the protrusions and the distance adjusting portions will be described in more detail with reference to FIGS. 3A and 3B.

Figure 3A:
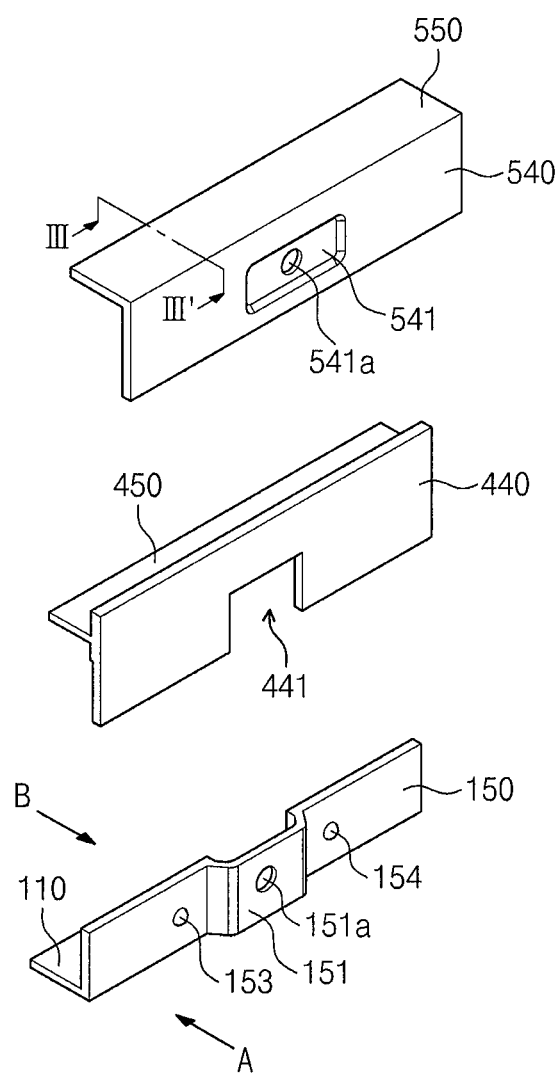
FIG. 3A is an enlarged perspective view showing a portion "II" shown in FIG. 1 when viewed in "A" direction.
Figure 3B:
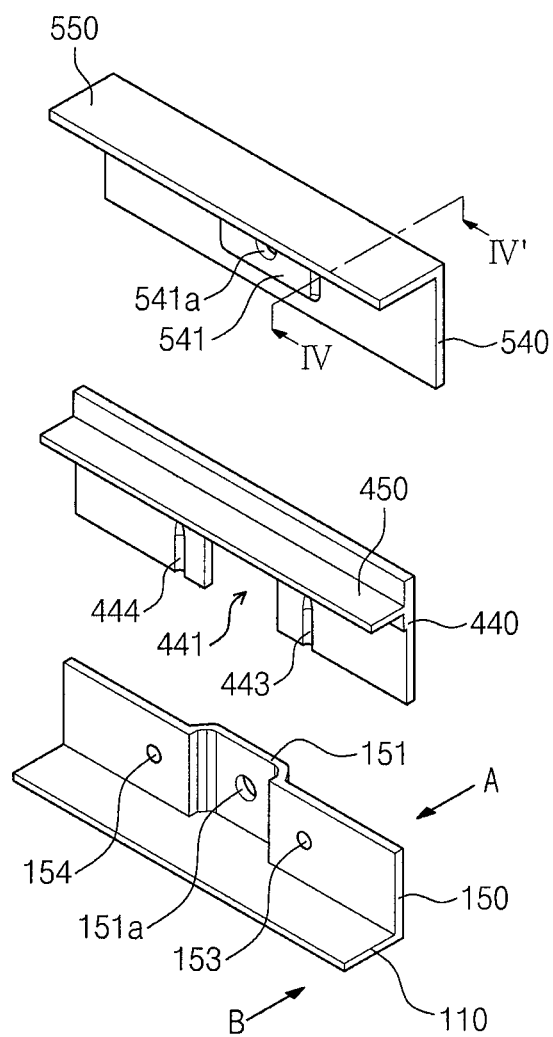
FIG. 3B is an enlarged perspective view showing a portion "II" shown in FIG. 1 when viewed in "B" direction.

FIG. 3A is a partially enlarged perspective view showing portion "II" in FIG. 1 when viewed in an "A" direction and FIG. 3B is a partially enlarged perspective view showing portion "II" shown in FIG. 1 when viewed in a "B" direction, opposite the "A" direction. FIGS. 3A and 3B show only the fourth engaging protrusion 151, the fourth cut-away portion 441, and the fourth engaging recess 541 on the fourth, eighth, and twelfth sidewalls 150, 440, and 540, respectively, and a set or predetermined area adjacent to the fourth engaging protrusion 151, the fourth cut-away portion 441, and the fourth engaging recess 541. It will be appreciated that the other engaging protrusions, cut-away portions, and engaging recesses not illustrated in FIGS. 3A and 3B may have the same or similar structure.

Referring to FIGS. 3A and 3B, the bottom receiving member 100 includes the seventh and eighth protrusions 153 and 154 adjacent to the fourth engaging protrusion 151 on the fourth sidewall 150.

The seventh and eighth protrusions 153 and 154 protrude outward from the outer surface of the fourth sidewall 150 and have a circular shape when viewed in the "A" direction (see FIG. 3A).

When viewed in the "A" direction, the seventh protrusion 153 is disposed at a left side of the fourth engaging protrusion 151 and the eighth protrusion 153 is disposed at a right side of the fourth engaging protrusion 151. A distance between the fourth engaging hole 151a and the seventh protrusion 153 may be substantially the same as a distance between the fourth engaging hole 151a and the eighth protrusion 154. The distance is set to have a value allowing a force to be applied to the intermediate frame 400 when the ninth screw 609 (refer to FIG. 1) is engaged.

First and second distance adjusting portions (e.g., slots or grooves) 443 and 444 are formed on an inner side surface of the eighth sidewall 440 of the intermediate frame 400. When viewed in the "B" direction (see FIG. 3B), the first distance adjusting portion 443 is disposed at a right side of the fourth cut-away portion 441 and the second distance adjusting portion 444 is disposed at a left side of the fourth cut-away portion 441.

The first and second distance adjusting portions 443 and 444 may be formed by partially cutting away the inner side surface of the eighth sidewall 440.

Figure 4A:
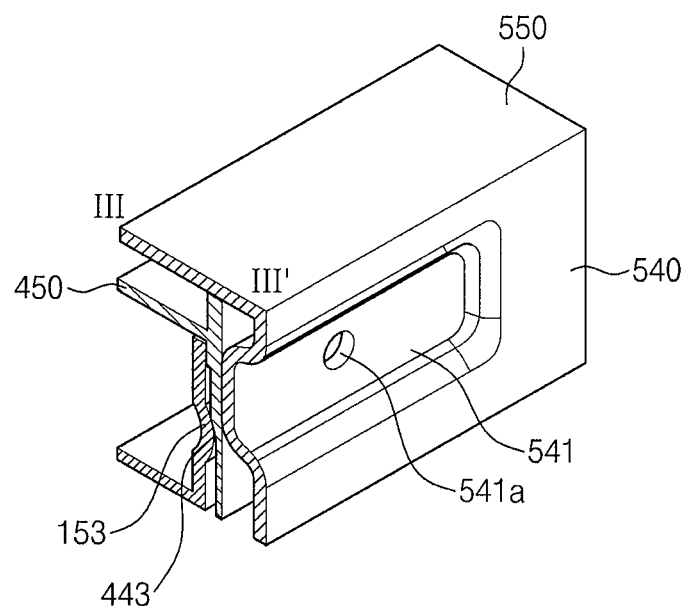
FIG. 4A is a perspective view taken along a line Ill-Ill' shown in FIG. 3A when the display apparatus is assembled.
Figure 4B:
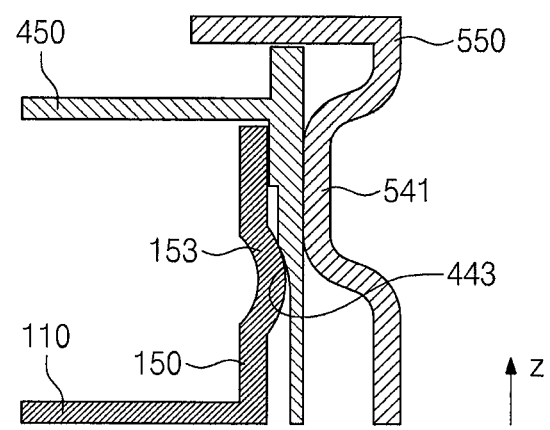
FIG. 4B is a cross-sectional view of FIG. 4A.
Figure 4C:
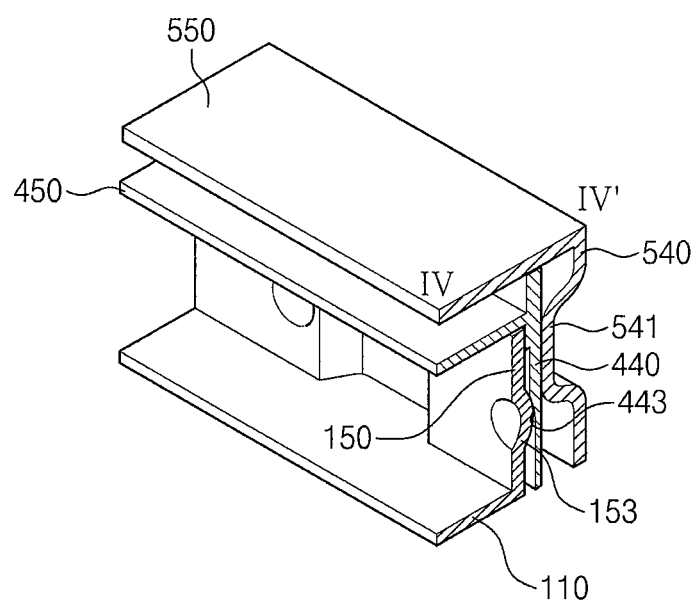
FIG. 4C is a perspective view taken along a line IV-IV' shown in FIG. 3B when the display apparatus is assembled.

FIG. 4A is a perspective view taken along a line in FIG. 3A when the display apparatus 1000 is assembled, FIG. 4B is a cross-sectional view of FIG. 4A, and FIG. 4C is a perspective view taken along a line IV-IV' in FIG. 3B when the display apparatus 1000 is assembled.

Referring to FIGS. 4A to 4C, when the bottom receiving member 100 and the intermediate frame 400 are coupled to each other, the seventh protrusion 153 of the fourth sidewall 150 is engaged with the first distance adjusting portion (e.g., slot or groove) 443 of the intermediate frame 400. The seventh protrusion 153 has a curved shape in which a gradient or angle of the seventh protrusion 153 relative to the fourth sidewall 150 increases from a center point of the seventh protrusion 153 along a direction perpendicular to the bottom portion of the bottom receiving member 100 (hereinafter, referred to as a z-axis direction).

The first distance adjusting portion 443 is formed in the inner side surface of the eighth sidewall 440 and has a cut-away shape corresponding to the curved or rounded shape of the seventh protrusion 153. The inner side surface of the first distance adjusting portion 443 engages the outer surface of the seventh protrusion 153 and is configured to move in the z-axis direction along the outer surface of the seventh protrusion 153.

Figure 5A:
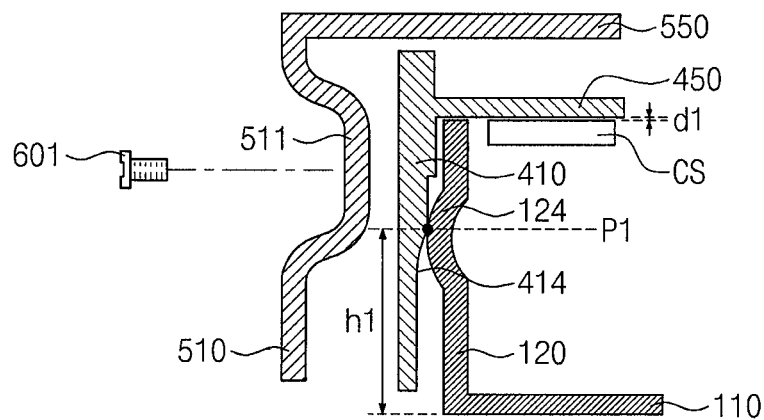
FIG. 5A is a cross-sectional view showing a first screw before the first screw has engaged the display apparatus.
Figure 5B:
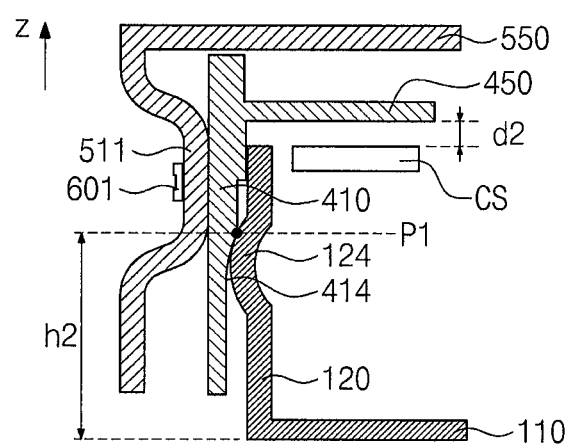
FIG. 5B is a cross-sectional view showing the first screw after the first screw has engaged the display apparatus.

FIG. 5A is a cross-sectional view showing the first screw 601 before the first screw 601 is engaged with the top receiving member 500 and the bottom receiving member 100, and FIG. 5B is a cross-sectional view showing the first screw 601 after the first screw 601 is engaged with the top receiving member 500 and the bottom receiving member 100.

Referring to FIG. 5A, a first distance d1 exists between the cover portion 450 of the intermediate frame 400 and the optical sheet (e.g., the protection sheet CS) before the top receiving member 500 is coupled to the bottom receiving member 100 by the first screw 601.

When the first distance d1 is smaller than a set or predetermined reference distance in the display apparatus 1000, the force supplied by the first screw 601 may be adjusted to correct the first distance d1 (e.g., the first screw 601 may be tightened or loosened to adjust the first distance d1 between the cover portion 450 of the intermediate frame 400 and the protection sheet CS).

Before the first screw 601 is engaged, as illustrated in FIG. 5A, a contact position P1 at which a third distance adjusting portion 414 of the intermediate frame 400 contacts the first protrusion 124 is located at a first height h1 from the bottom portion 110 of the bottom receiving member 100.

As the first screw 601 engages the top receiving member 500 and the bottom receiving member 100, the third distance adjusting portion 414 raises up in the z-axis direction along the outer surface of the first protrusion 124 due to the force supplied by the first screw 601. The contact position P1 at which the third distance adjusting portion 414 contacts the first protrusion 124 is changed to a second height h2 from the bottom portion 110. In the illustrated embodiment, the second height h2 is greater than the first height h1. Thus, a second distance d2 greater than the first distance d1 is defined between the cover portion 450 of the intermediate frame 400 and the protective sheet CS when the first screw 601 engages the top receiving member 500 and the bottom receiving member 100.

The second distance d2 may be substantially the same as the reference distance. The height of the contact position P1 from the bottom portion 110 and the second distance d2 may be adjusted depending on the force applied to the first screw 601.

In addition, the distance between the first sidewall 120 of the bottom receiving member 100 and the cover portion 450 of the intermediate frame 400 may be adjusted or corrected in the same manner described above.

In FIGS. 5A and 5B, only the portion of the display apparatus 1000 with which the first screw 601 is engaged has been shown, but the distance between the cover portion 450 and the protection sheet CS may be adjusted or corrected in the same manner described above in portions of the display apparatus 1000 with which the second to tenth screws 602 to 610 (refer to FIG. 1) are engaged.

Figure 6A:
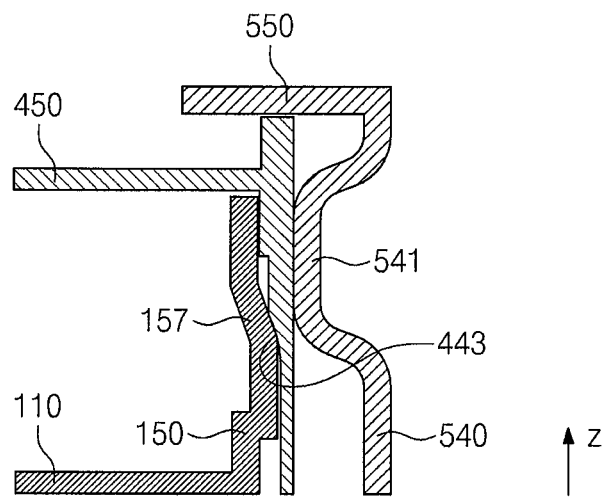
FIG. 6A is a cross-sectional view showing a bottom receiving member, an intermediate frame, and a top receiving member according to another example embodiment of the present disclosure.
Figure 6B:
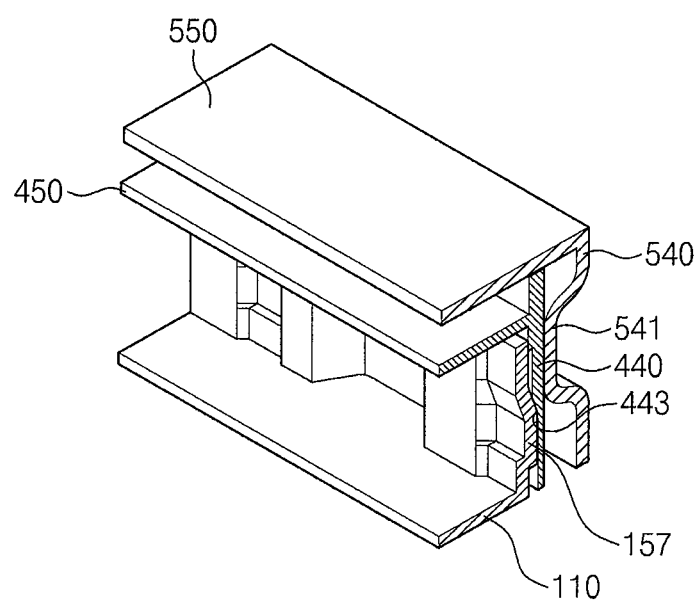
FIG. 6B is a perspective view showing the bottom receiving member, the intermediate frame, and the top receiving member of FIG. 6A.

FIG. 6A is a cross-sectional view showing a bottom receiving member, an intermediate frame, and a top receiving member coupled together according to another example embodiment of the present disclosure, and FIG. 6B is a perspective view showing the bottom receiving member, the intermediate frame, and the top receiving member according to the example embodiment illustrated in FIG. 6A.

Referring to FIGS. 6A and 6B, the fourth sidewall 150 of the bottom receiving member 100 includes a protrusion 157 having an inclined or angled structure. An outer surface of the protrusion 157 is inclined toward the fourth sidewall 150 as it extends along the z-axis direction.

The protrusion 157 on the fourth sidewall 150 is engaged with the first distance adjusting portion (e.g., slot or groove) 443 in the intermediate frame 400.

The first distance adjusting portion 443 is defined in the inner side surface of the eighth sidewall 440 and has the cut-away shape corresponding to the curved or inclined shape of the protrusion 157. Accordingly, the inner side surface of the first distance adjusting portion 443 is engaged with the inclined surface of the protrusion 157 and is configured to move in the z-axis direction along the inclined surface of the protrusion 157.

Figure 7A:
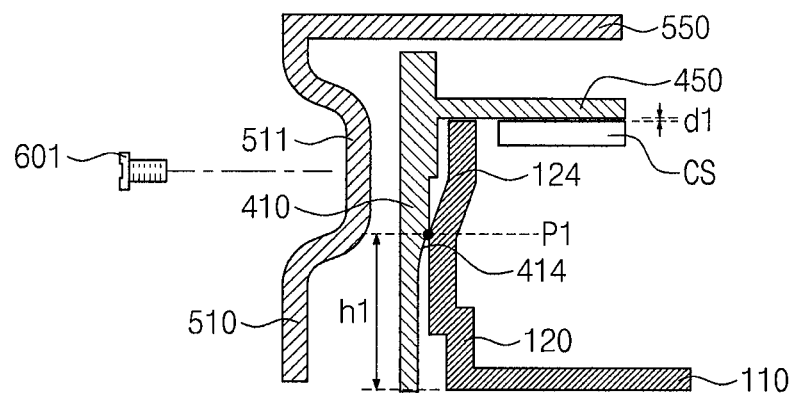
FIG. 7A is a cross-sectional view showing a first screw before the first screw has engaged the bottom receiving member, the intermediate frame, and the top receiving member of FIGS. 6A and 6B.
Figure 7B:
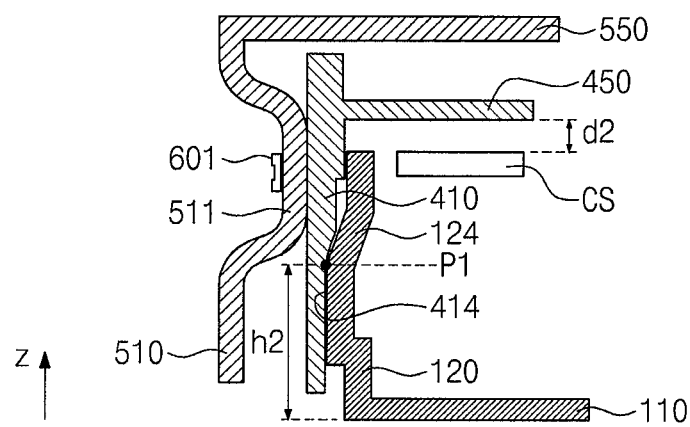
FIG. 7B is a cross-sectional view showing the first screw after the first screw has engaged the bottom receiving member, the intermediate frame, and the top receiving member of FIGS. 6A and 6B.

FIG. 7A is a cross-sectional view showing the first screw 601 before the first screw 601 is engaged with the top receiving member 500 and the bottom receiving member 100 and FIG. 7B is a cross-sectional view showing the first screw 601 after the first screw 601 is engaged with the top receiving member 500 and the bottom receiving member 100.

Referring to FIG. 7A, a first distance d1 exists between the cover portion 450 of the intermediate frame 400 and the optical sheet (e.g., the protection sheet CS) before the top receiving member 500 is coupled to the bottom receiving member 100 by the first screw 601.

Before the first screw 601 is engaged, a contact position P1 at which a third distance adjusting portion 414 of the intermediate frame 400 contacts the first protrusion 124 is located at a first height h1 from the bottom portion 110 of the bottom receiving member 100.

As the first screw 601 engages the top receiving member 500 and the bottom receiving member 100, the third distance adjusting portion 414 raises up in the z-axis direction along the outer surface of the first protrusion 124 due to the force supplied by the first screw 601. The contact position P1 at which the third distance adjusting portion 414 contacts the first protrusion 124 is changed to a second height h2 from the bottom portion 110. In the illustrated embodiment, the second height h2 is greater than the first height h1. Therefore, a second distance d2 greater than the first distance d1 is defined between the cover portion 450 of the intermediate frame 400 and the protective sheet CS when the first screw 601 engages the top receiving member 500 and the bottom receiving member 100.

The second distance d2 may be substantially the same as the reference distance. The height of the contact position P1 from the bottom portion 110 and the second distance d2 may be adjusted depending on the force applied to the first screw 601.

In addition, the distance between the first sidewall 120 of the bottom receiving member 100 and the cover portion 450 of the intermediate frame 400 may be adjusted or corrected in the same manner described above.

In FIGS. 7A and 7B, only the portion of the display apparatus 1000 with which the first screw 601 is engaged has been shown, but the distance between the cover portion 450 and the protection sheet CS may be adjusted or corrected in the same manner described above in portions of the display apparatus 1000 with which the second to tenth screws 602 to 610 (refer to FIG. 1) are engaged.

Figure 8A:
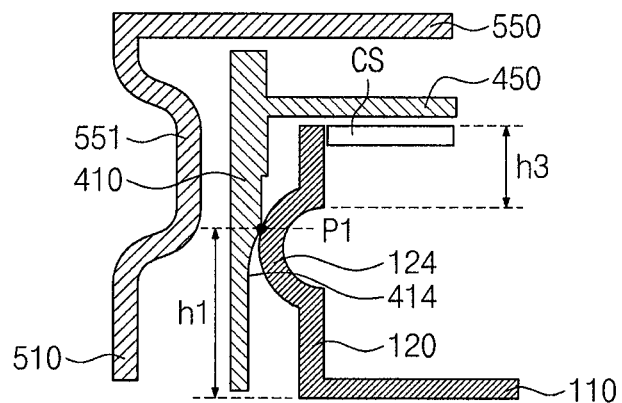
FIGS. 8A and 8B are cross-sectional views showing a method of adjusting a position of an intermediate frame by adjusting a size and a position of a protrusion on a bottom receiving member according to one embodiment of the present disclosure.
Figure 8B:
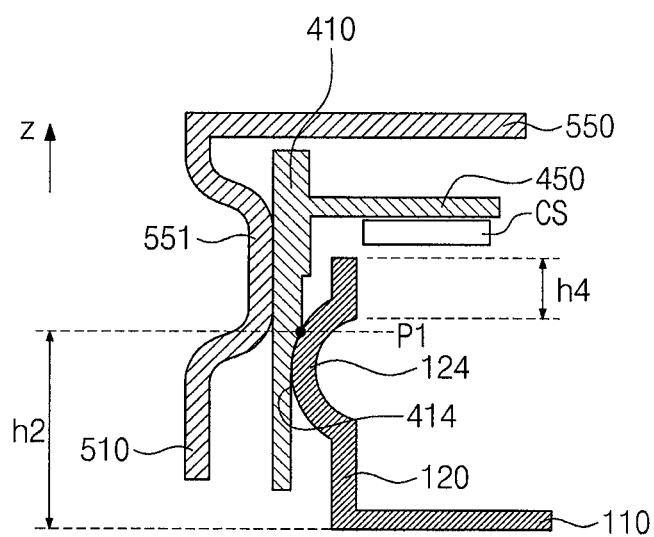

FIGS. 8A and 8B are cross-sectional views showing a method of adjusting the position of the intermediate frame 400 by adjusting a size and a position of a protrusion on the bottom receiving member 100.

Referring to FIGS. 8A and 8B, when the distance between the first sidewall 120 of the bottom receiving member 100 and the cover portion 450 is smaller than a set or predetermined reference value, the distance may be corrected by adjusting a size and a position of the first protrusion 124 on the bottom receiving member 100.

Before correcting or adjusting the distance of the intermediate frame 400, the first protrusion 124 is formed such that an initial position of the first protrusion 124 is located at a third height h3 from the upper end of the first sidewall 120. Accordingly, the contact position P1 at which the third distance adjusting portion 414 of the intermediate frame 400 contacts the first protrusion 124 is located at the first height h1 from the bottom portion 110, as illustrated in FIG. 8A.

Then, a process of correcting the distance between the cover portion 450 and the first sidewall 120 is performed such that the initial position of the first protrusion 124 is located at a fourth height h4 from the upper end of the first sidewall 120 by increasing the size of the first protrusion 124. Accordingly, the contact position P1 at which the third distance adjusting portion 414 of the intermediate frame 400 contacts the first protrusion 124 may be located at a second height h2 from the bottom portion 110 due to the movement of the first protrusion 124, as illustrated in FIG. 8B.

Accordingly, the distance between the first sidewall 120 of the bottom receiving member 100 and the cover portion 450 may be increased by increasing the size of the first protrusion 124 on the bottom receiving member 100.

In FIGS. 8A and 8B, the distance between the first sidewall 120 and the cover portion 450 is increased by increasing the size of the first protrusion 124, but the present disclosure is not limited thereto or thereby. For instance, the distance between the first sidewall 120 and the cover portion 450 may be increased by adjusting the height of the first protrusion 124 relative to the bottom portion 110 without changing the size of the first protrusion 124. In one or more alternate embodiments, the distance between the first sidewall 120 and the cover portion 450 may be increased by both increasing the height of the first protrusion 124 relative to the bottom portion 110 and increasing the size of the first protrusion 124.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed, and equivalents thereof.

What is claimed is:

1. A display apparatus comprising:
   a backlight unit configured to generate light;
   a bottom receiving member comprising a bottom portion and a first sidewall portion extending from the bottom portion to define a receiving space accommodating the backlight unit;
   an intermediate frame coupled to the bottom receiving member, the intermediate frame comprising a second sidewall portion facing the first sidewall portion of the bottom receiving unit and a cover portion extending inward from the second sidewall portion to cover an upper edge of the backlight unit; and
   a display panel on the cover portion for receiving the light from the backlight unit and displaying an image, wherein the bottom receiving member comprises a protrusion protruding outward from the first sidewall portion, and the intermediate frame comprises a distance adjusting portion in an inner side surface of the second sidewall portion engaged with an outer surface of the protrusion, and wherein the engagement between the distance adjusting portion and the protrusion is configured to move the cover portion along a z-axis direction away from the bottom portion.

2. The display apparatus of claim 1, wherein the distance adjusting portion is a groove.

3. The display apparatus of claim 1, wherein the protrusion has a curved shape in which a gradient of the protrusion relative to the first sidewall portion increases along the z-axis direction from a center of the protrusion.

4. The display apparatus of claim 3, wherein the distance adjusting portion has a curved or inclined shape configured to move in the z-axis direction along the outer surface of the protrusion.

5. The display apparatus of claim 1, wherein the outer surface of the protrusion has an inclined structure inclined toward the first sidewall portion as the protrusion extends along the z-axis direction.

6. The display apparatus of claim 5, wherein the distance adjusting portion has a curved or inclined shape configured to move in the z-axis direction along the outer surface of the protrusion.

7. The display apparatus of claim 1, further comprising a top receiving member comprising a third sidewall portion facing the second sidewall portion of the intermediate frame and a front surface portion extending inward from the third sidewall portion to fix the upper edge of the display panel, wherein the top receiving member, the intermediate frame, and the bottom receiving member are coupled to each other by a screw.

8. The display apparatus of claim 7, wherein:
   the first sidewall portion of the bottom receiving member comprises at least one engaging protrusion engaged with the screw;
   the third sidewall portion of the top receiving member comprises an engaging recess corresponding to the engaging protrusion on the bottom receiving member; and
   the protrusion and the distance adjusting portion are located at positions within a set range from the engaging protrusion and the engaging recess.

9. The display apparatus of claim 8, wherein the set range is a distance that the distance adjusting portion moves in the z-axis direction along the outer surface of the protrusion when a force is applied to the intermediate frame by the screw being engaged with the top receiving member and the bottom receiving member.

10. The display apparatus of claim 1, wherein the backlight unit comprises:
  a light source that emits the light;
  a light guide member that guides the light to the display panel; and
  an optical sheet disposed between the light guide member and the display panel, the cover portion of the intermediate frame covering an edge of the optical sheet.

11. The display apparatus of claim 10, wherein the light source comprises:
  a printed circuit board adjacent to at least one side surface of the light guide member; and
  a plurality of light emitting diodes on the printed circuit board.

12. A method of assembling a display apparatus, the method comprising:
  positioning a backlight unit in a receiving container defined by a bottom receiving member comprising a bottom portion and a first sidewall portion extending from the bottom portion;
  placing an intermediate frame comprising a second sidewall portion facing the first sidewall portion and a cover portion extending inward from the second sidewall portion to cover an upper edge of the backlight unit, wherein the intermediate frame comprises a distance adjusting portion defined in an inner side surface of the second sidewall portion engaged with an outer surface of a protrusion protruding outward from the first sidewall portion of the bottom receiving member;
  placing a display panel on the cover portion of the intermediate frame, wherein the display panel is configured to receive light from the backlight unit and display an image; and
  adjusting a distance between the cover portion and the backlight unit, the adjusting of the distance comprising moving the cover portion along a z-axis direction away from the bottom portion by sliding the protrusion along the distance adjusting portion.

13. The method of claim 12, wherein the distance adjusting portion is a groove.

14. The method of claim 12, further comprising coupling a top receiving member to the bottom receiving member, wherein the top receiving member comprises a third sidewall portion facing the second sidewall portion of the intermediate frame and a front surface portion extending inward from the third sidewall portion to fix an upper edge of the display panel.

15. The method of claim 14, wherein the top receiving member is coupled to the bottom receiving member by a screw, and wherein a force generated when the screw is engaged with the top and bottom receiving members performs the adjusting of the distance between the cover portion and the backlight unit comprises moving the intermediate frame along the z-axis direction away from the bottom portion.

16. The method of claim 12, wherein the adjusting of the distance between the cover portion and the backlight unit further comprises adjusting a position of the protrusion in the z-axis direction.

17. The method of claim 12, wherein the protrusion has a curved shape in which a gradient of the protrusion relative to the first sidewall portion increases along the z-axis direction from a center point of the protrusion.

18. The method of claim 17, wherein the distance adjusting portion has a curved or inclined shape configured to move in the z-axis direction along the outer surface of the protrusion.

19. The method of claim 12, wherein the outer surface of the protrusion has an inclined structure inclined toward the first sidewall portion as the protrusion extends along the z-axis direction.

20. The method of claim 19, wherein the distance adjusting portion has a curved or inclined shape configured to move in the z-axis direction along the outer surface of the protrusion.

* * * * *